June 3, 1969

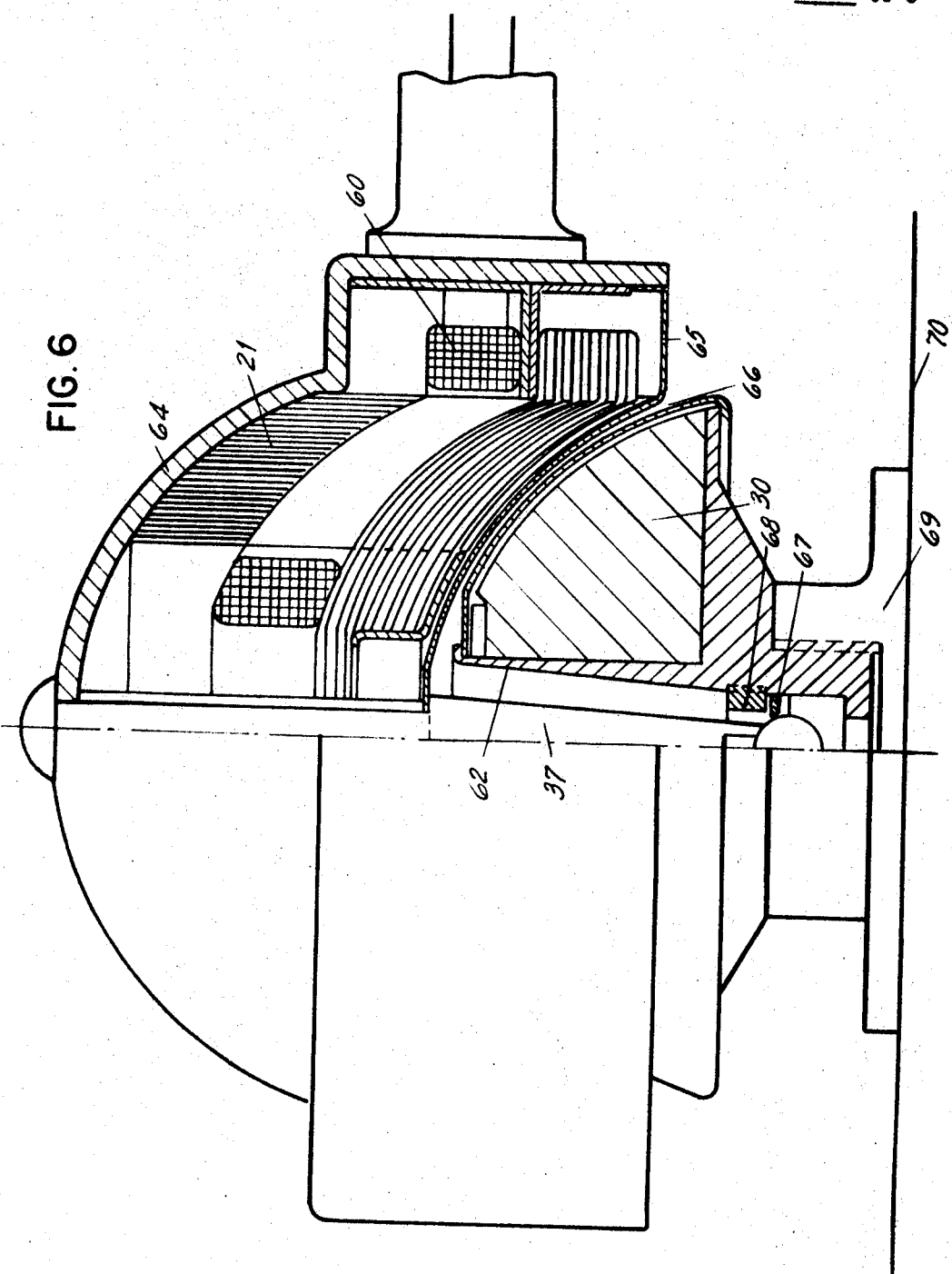

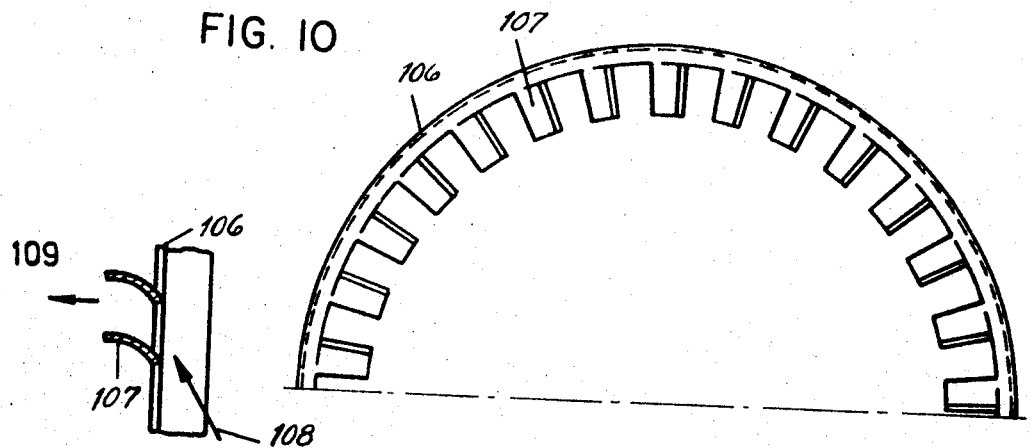
FIG. 10
FIG. 11
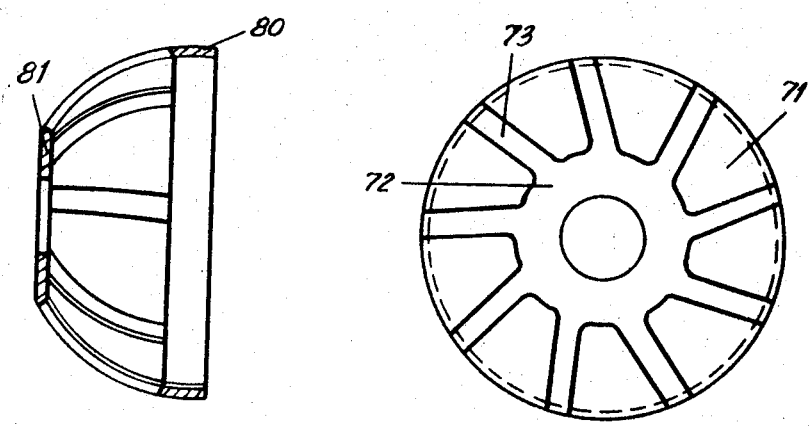
FIG. 8
FIG. 7

N. LAING 3,447,469

INDUCTION MOTOR HAVING SPHERICAL AIRGAP

Filed Oct. 17, 1967

INVENTOR.
Nikolaus Laing
BY
ATTORNEYS

//  # United States Patent Office 3,447,469
Patented June 3, 1969

3,447,469
INDUCTION MOTOR HAVING SPHERICAL AIRGAP
Nikolaus Laing, 35–37 Hofener Weg,
7141 Aldingen, Germany
Continuation-in-part of application Ser. No. 509,714,
Nov. 26, 1965. This application Oct. 17, 1967, Ser.
No. 675,927
Int. Cl. F04d 13/06; H02k 1/22
U.S. Cl. 103—87                               24 Claims

ABSTRACT OF THE DISCLOSURE

Induction motor having spherical airgap between the armature and stator whereby the armature may have a degree of universal movement with respect to the stator and whereby the stator comprises an endless metal strip formed into a geometrical spiral with one edge of the strip forming in part a spherical surface.

Cross-references to related applications

This application is a continuation-in-part of copending application Ser. No. 509,714, filed Nov. 26, 1965, now Patent No. 3,354,833.

Background of the invention

The invention relates generally to induction type electrical motors having a spherical airgap between the stator and the armature where the motors are used in such devices as grinders, polishers, pumps and blowers. More particularly, the invention relates to the construction of stators for use in such motors wherein it is desired that the armature have a degree of universal movement with respect to the stator.

A difficulty existing with conventional induction type motors having spherical airgaps is that the stator usually comprises a plurality of flat sheet metal strips overlying one another where the strips have holes of varying diameters punched therein to form a generally spherical surface. Such stators have been expensive to manufacture since each sheet metal strip required a special punching tool in order to punch the hole of the desired diameter. It is therefore an object of the invention to provide for a stator construction which may be conveniently and economically made.

Broadly, the invention contemplates having the stators of motors with spherical airgaps comprising a wound spiral-shaped strip where the edges of the strip are positioned to form a spherical surface. Coils are provided in pole grooves which extend along the spherical surface resulting in a compact stator unit having small dissipation losses. Further, the invention comprises having the armature in a substantially hemispherical shape built from segments or from solid parts and includes having the coil of the armature being formed from a deep-drawn cap made of an electrically conductive sheet material.

Still further features of the invention comprise means for preventing the hemispherically shaped armature from falling from its support when the current is switched off and means for cooling the motor when encased in a waterproof casing.

Description of the drawings

FIG. 6 illustrates an induction motor having a stator and armature of the types illustrated in FIGS. 1 and 3 as applied to a hand polisher;
FIG. 7 illustrates a further form of armature construction as seen from the direction of the airgap;
FIG. 8 illustrates a coil for use with the armature of FIG. 7;
FIG. 10 is a plan view of guide vanes utilized in the pump construction of FIG. 9;
and
FIG. 11 is an enlarged cross-sectional view of the cascade of guide vanes of FIG. 10.

Description of the preferred embodiment

Figure 1:
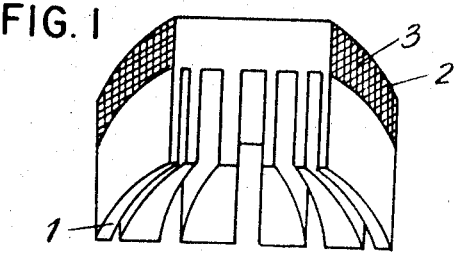
FIG. 1 is a partial sectional view of the stator made from a sheet metal strip wound in a geometric spiral.
Figure 2:
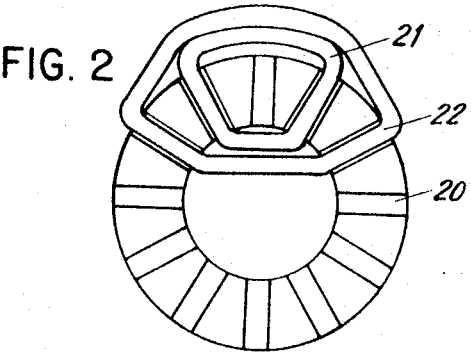
FIG. 2 is a view of FIG. 1 as seen from the airgap.

Referring to FIG. 1, there is illustrated a section of a stator made up from a single sheet metal strip wound in a geometric spiral such that the layers of the strip are axially displaced. The edges 1, 2 of the strip form a generally spherical surface. In addition, the stator has grooves 20 cut therein as shown in FIG. 2. Coils 21, 22 extend through the grooves 20 and are shaped to follow the limiting line 3 as shown in FIG. 1.

Figure 3:
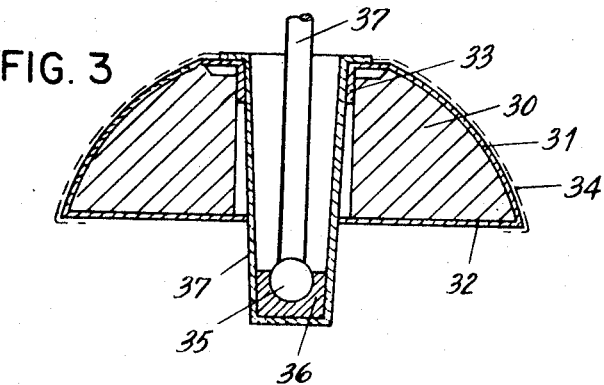
FIG. 3 is a cross-sectional view of an armature adapted to be utilized with the stator of FIG. 1.

FIG. 3 illustrates an armature for use with the stator as shown in FIG. 1 where the armature comprises an iron ring 30 made of a magnetically soft iron and which has on the outer periphery thereof a copper or aluminum coating 31. The coating 31 has rings 32, 33 at both of its axial ends which serve as short circuiting rings. Preferably, a second coating 34 of low electrically conductive but high magnetically conductive material is positioned exterior of the coating 31. Preferably, where the armature is to be used in a pump, this coating 34 should be of a nickel-iron alloy to provide protection against corrosion, but also the copper layer 31 preferably produced by a galvanic process can be used as well to protect the iron part 30 against corrosion. Also, the coating 34 may comprise a plastic material filled with a soft magnetic material.

A bushing 36 is positioned in a hollow body 37 and supports the ball 35 which, in turn, is fixed to the stator of the motor. The bushing 36 is preferably made of aluminum oxide while the ball 35 of a tungsten carbide with the bushing being silver soldered to the body 37.

Figure 4:
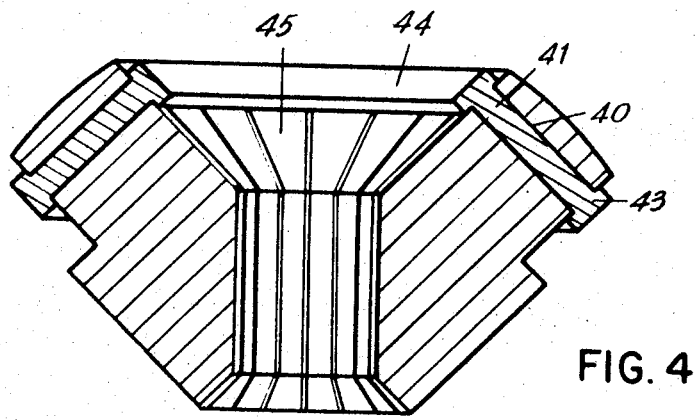
FIG. 4 is a cross-sectional view of a further embodiment of an armature made up of a plurality of separate segments.
Figure 5:
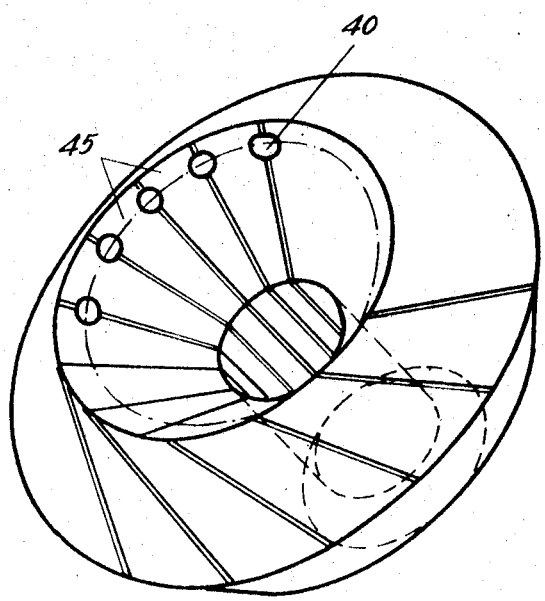
FIG. 5 is a perspective view of a portion of an armature of the type illustrated in FIG. 4 before the coil is cast therein.

FIG. 4 illustrates a further embodiment of an armature made according to the invention where the armature is made up of a plurality of segments 45 comprising a sintered iron material. Channels 40 are positioned between adjacent segments through which bars 41 of a squirrel cage type of coil extend. The bars 41, in turn, connect with the short circuiting rings 43, 44. The coils comprising the parts 41, 43 and 44 are cast into the armature and FIG. 5 illustrates the armature before parts 41, 43 and 44 are cast therein.

FIG. 6 illustrates a motor constructed according to the present invention as used with a hand polisher having polishing disc support 69 adapted to support a polisher, not shown, in the plane 70. The stator of the motor comprises a single strip 21 which is spiraled in the manner shown in FIG. 1 such that one edge of the strip forms a generally spherical surface. A coil 60 is mounted on the spiral strip 21. A sheet iron dissipating ring contacts the poles of the stator to prevent harmonic waves.

Pivotal movement of the armature 30 is limited by the part 62 engaging part 37. A housing 64 of a heat conducting material surrounds the stator 21 and coil 60. The inner surface of the housing is separated from the armature by thin waterproof metal partitions 65 made either of a nonmagnetic material such as chrome steel or of a low magnetically conductive material. This construction aids in uniformly distributing the lines of magnetic force throughout the area of the spherical gap 66 so that the magnetic saturation of the airgap is lowered and the total magnetic forces are raised.

A ring 67 is locked in place to the armature by means of a set screw 68. The ring has a smaller inner diameter than that of a ball connected to the stator and is positioned axially with respect to the ball in order to prevent friction. When the motor is switched off, the ring 67 prevents the armature 30 from falling out of the motor when the motor is raised.

Referring to FIG. 7, there is illustrated an armature made according to the invention which comprises a forged or sintered iron part 71 over which a copper or aluminum coil 72 may be positioned. Ribs 73 of the coil are adapted to extend into grooves contained on the iron part 71 in order that the outer periphery of the armature will have a generally smooth spherical surface. The coil 72 may be punched from a hemispherical cup. FIG. 8 illustrates the coil before it is applied to the iron portion of the armature and illustrates the short circuiting rings 80 and 81.

Figure 9:
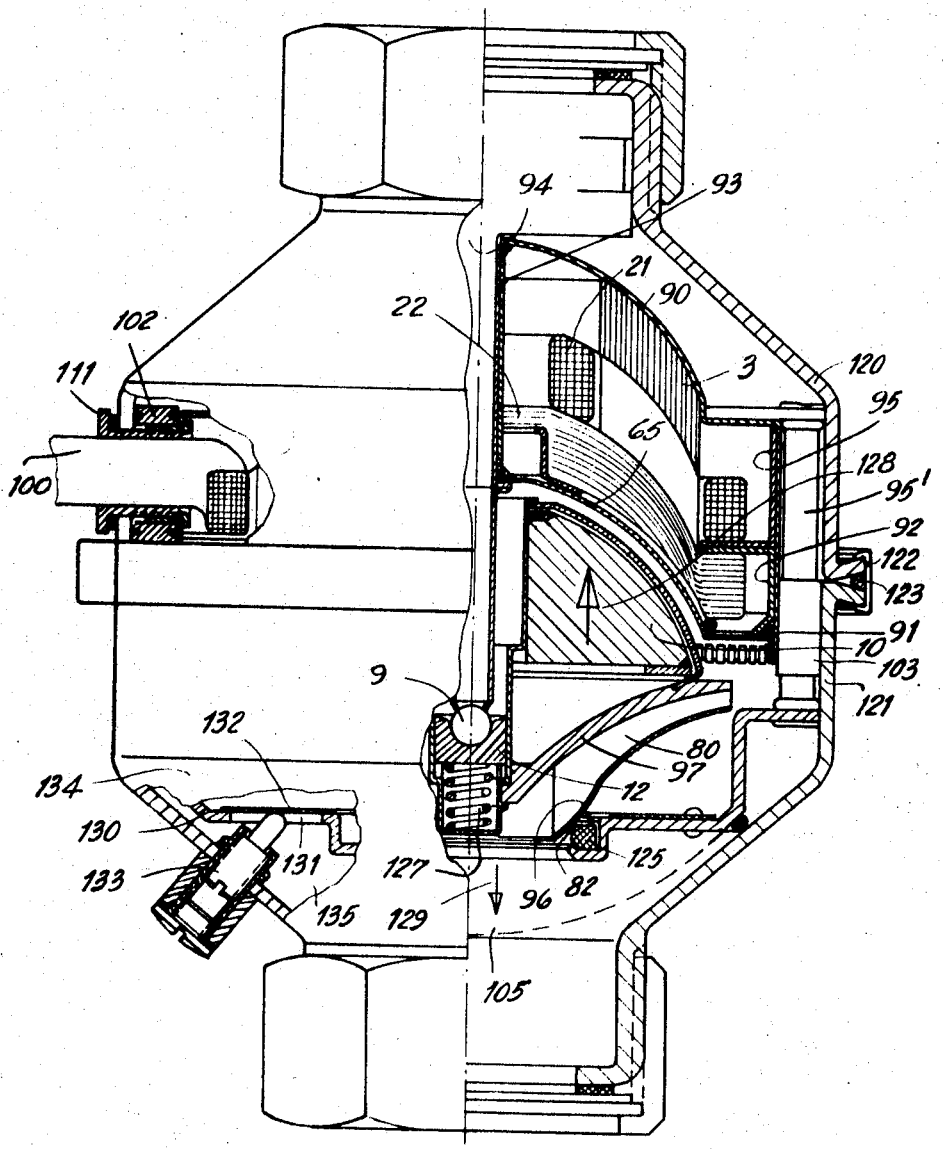
FIG. 9 is a cross-sectional view of a pump incorporating an induction motor made according to the invention.

FIG. 9 illustrates a pump incorporating a motor made according to the invention. The stator 3 is constructed as shown in FIG. 1 with the coil 21 and the layer 22, which is located axially beside it, being arranged as shown in FIG. 2. The thin partition 65 and the motor housing 90 form a water tight space into which a rubber ring 91 is pressed into the corner area by means of an aluminum ring 92. A small tube 93 which is conically expanded at the ends forms a waterproof seal together with the rubber rings 94. An aluminum ring 95 extends over the aluminum ring 92 and in the housing 90. Ring areas of the aluminum rings 92 and 95 are directed radially towards the center and reach the periphery of the iron lower stator 3 such that they are located between the lower coil layer 22 and the upper coil layer to thus ensure heat transfer from the coils 21 and 22 to the wall of the housing 90.

The housing 90 is connected to a ring 130 and held at a predetermined distance by three tubular rivets 95' which are spaced on the periphery. A rubber ring 125 is inserted in ring 130 and forms an annular gap 82 together with the cover plate 96 of the pump rotor 97. As long as the current is switched on, the armature 10 is attracted in the direction of the arrow 128, and the spring 127 contacting the bushing 12 is compressed. As soon as the current is switched off, the axial magnetic component 128 is eliminated, and the unit consisting of the armature 10 and the pump rotor 97 with the blade cascade 80 and the cover plate 96 is shifted in the direction 129 and pressed against the ring 125 by means of the spring 127, so that noise is prevented. If dirt particles penetrate into the gap 82, the armature executes a tumbling movement around the ball 9, so that the dirt particles are automatically removed. The ball 9 and the bushing 12 are preferably made from materials of a hardness which is greater than the hardness of possible additions to the liquid to be moved.

The lead 100 representing the connection to the electrical power supply is safely protected against the liquid by means of a screw connection 101 and a ring 102 bearing two rubber sealing rings. A bypass between the suction side 135 and the discharge side 134 can be effected by openings 131 which can be closed by a ring 132 which, in turn, is preferably spring mounted, so that the liquid is not allowed to flow back through the wall 130. If, on the other hand, the maximum pressure is intended to be low, the ring 132 is lifted by means of the screw 133 so that part of the liquid is allowed to flow back from the discharge side to the suction side 135.

The pump housing comprises two identical cups 120 and 121 which are axially connected by a ring 122 and sealed by a rubber ring 123. In order to convert the centrifugal energy of the liquid in the outlet to useful energy, a cascade of guide vanes 103 is provided to effect a deflection of the entering flow to a direction which runs approximately axial to the pump. The wire net 105 is intended to screen off the dirt.

FIGS. 10 and 11 illustrate the cascade of guide vanes 103. The cascade is punched in a continuous process corresponding to the profile 106 while the vanes 107 are not only punched but also bent. The twist flow 108 of liquid is deflected to the direction 109 such as to secure a pressure gain.

All known circulation pumps, e.g., for central heating purposes, have an armature which is operated within the liquid circuit, whereby the stator and the coils are cooled by the liquid as well. In order to conduct the stator heat into the liquid, the outer housings always consist of aluminum, whereby the heat is conducted to the proper pump housing, which is located at the one end of the motor. This is the reason, why those pumps have a very high weight and a very big volume. In the case of the described pump the stator 3 is located, because of the coaxial throughflow, together with the coils 21 in a housing 90, which is surrounded by the liquid and is therefore being cooled extremely good. Thus the described pump—having the same efficiency—requires less iron and copper.

I claim:

1. An induction motor having a spherical airgap extending between the stator and the armature characterized in that said stator comprises a metal strip wound upon itself into a plurality of layers of a geometric spiral with each layer of the spiral being shifted axially with respect to an adjacent layer whereby an end of the spiraled layers approximate a spherical surface and having a plurality of coil receiving grooves in said strip along the spherical surfaces.

2. An induction motor as claimed in claim 1 characterized further in that coils are positioned in said grooves.

3. An induction motor as claimed in claim 1 characterized further in that said armature comprises a soft iron piece forming a segment of a sphere and having on the outer surface thereof a coating made of a material of high electrical conductivity.

4. An induction motor as claimed in claim 3 characterized further in that said coating has on the outer surface thereof a second coating made from a material of high magnetic but low electrical conductivity.

5. An induction motor as claimed in claim 1 characterized further in that said armature has a shell extending through the center thereof exceeding the axial length of the armature and a bearing means in said shell.

6. An induction motor as claimed in claim 1 characterized further in that said armature incorporates a bearing which forms a universal link with respect to said stator and wherein the center of gravity of said armature coincides approximately with the center of the spherical surface of said stator adjacent said armature.

7. An induction motor as claimed in claim 1 characterized in having a housing enclosing said stator with said housing including a spherical wall of nonmagnetic material opposite said armature.

8. An induction motor as claimed in claim 7 characterized further in that coils are positioned in said grooves with said coils having heat transfer rings positioned therebetween and contacting said housing to form a high heat conductive connection to the housing in order to dissipate coil heat.

9. An induction motor as claimed in claim 8 characterized further in that the heat transfer rings are L-shaped in cross section.

10. An induction motor according to claim 1 characterized further in that said armature is rigidly connected to a polishing disc.

11. An induction motor according to claim 5 characterized further in that said bearing means comprises a bushing connected to said shell, and a ball rigidly connected with respect to said stator adapted to engage said bushing.

12. An induction motor according to claim 11 characterized further in that a ring having an internal diameter less than the diameter of said ball is positioned in said shell axially with respect to said ball to prevent movement of said ball out of said shell.

13. An induction motor according to claim 1 characterized in having a housing enclosing said stator with said housing including a thin sperical wall of soft magnetic material opposite said armature.

14. An induction motor having a spherical airgap extending between the stator and armature characterized in that the armature comprises a plurality of soft magnetic segments having channels formed between adjacent segments into which a highly conductive material is adapted to be cast to form coils and wherein said segments form portions of a substantially cone-shaped surface.

15. An induction motor as claimed in claim 14 characterized further in that said segments comprise sintered iron.

16. A pump having therein an induction motor with a spherical airgap extending between the stator and armature portions of said motor, characterized in that said motor is concentrically mounted in a pump housing comprising two similarly shaped bodies with a pump inlet duct fixed to one of said bodies and a pump outlet duct fixed to the other of said bodies.

17. A pump incorporating an induction type motor having a spherical airgap extending between the armature and stator portions of the motor, characterized in having a housing enclosing said motor, a shell extending through the armature, a bushing positioned in said shell and operatively connected thereto, a ball rigidly connected with respect to said stator which ball engages said bushing, and a rotor connected to said armature having a cover which forms a suction area with the rotor in the shape of a spherical surface with the center of said spherical surface coinciding substantially with the center of said ball.

18. A pump according to claim 17 further characterized in having spring means for moving said armature axially away from said stator when said pump is not operating.

19. A pump incorporating an induction type motor having a spherical airgap extending between the armature and stator portions of the motor, and a rotor characterized in having a housing enclosing the motor, a bushing which forms a universal link with respect to said stator whereby a bushing is suspended between the stator and the rotor by means permitting an axial movement of the armature and incorporating a spring, having the tendency to move the armature away from the stator, and said rotor connected to that armature and means to guide the armature to prevent tumbling if the armature is moved into a position away from the stator.

20. A pump according to claim 19 further characterized in having a flexible sealing ring fixed with respect to said housing and adapted to seal with said cover when said machine is not operating.

21. An induction type motor as claimed in claim 1, characterized further in that said armature incorporates a bushing which forms a universal link with respect to that stator and wherein the center of the universal movement is nearly identical with the center of the spherical surface of the stator.

22. An induction type motor according to claim 1 with a semispherical armature characterized in that the armature comprises a cap of a material with high electric conductivity and whereby ribs (73) are formed by a punching process.

23. An induction type motor according to claim 3 characterized further in that said armature has on its surface a coating of copper not only for electric purposes but also to protect the armature against corrosion.

24. A pump having therein an induction motor with a spherical airgap extending between the stator and armature portions of said motor, characterized in that said motor is concentrically mounted in a pump housing comprising two similarly shaped bodies with a pump inlet duct fixed to one of said bodies and a pump outlet duct fixed to the other of said bodies; and said stator comprises a metal strip wound upon itself into a plurality of layers of a geometric spiral with each layer of the spiral being shifted axially with respect to an adjacent layer whereby an end of the spiraled layers approximate a spherical surface and having a plurality of coil receiving grooves in said strip along the spherical surfaces.

References Cited

UNITED STATES PATENTS

| | | | |
|---|---|---|---|
| 1,559,920 | 11/1925 | Stewart | 318—243 |
| 2,470,565 | 5/1949 | Loss | 230—115 |
| 3,178,600 | 4/1965 | Bers | 310—166 |

ROBERT M. WALKER, Primary Examiner.

U.S. Cl. X.R.

310—166, 264

PO-1050
(5/69)

UNITED STATES PATENT OFFICE
CERTIFICATE OF CORRECTION

Patent No. 3,447,469     Dated June 3, 1969

Inventor(s) Nikolaus Laing

It is certified that error appears in the above-identified patent and that said Letters Patent are hereby corrected as shown below:

Page 1, column 1, in the heading immediately after reference to Serial No. 675,927, the following should appear:

--Claims priority, application Germany,

September 7, 1966, A53,448--

SIGNED AND
SEALED

NOV 4 1969

(SEAL)
Attest:

Edward M. Fletcher, Jr.
Attesting Officer

WILLIAM E. SCHUYLER, JR.
Commissioner of Patents